No. 859,814. PATENTED JULY 9, 1907.
A. T. HUGHES.
MEANS FOR LOCKING NUTS TO BOLTS.
APPLICATION FILED APR. 1, 1907.
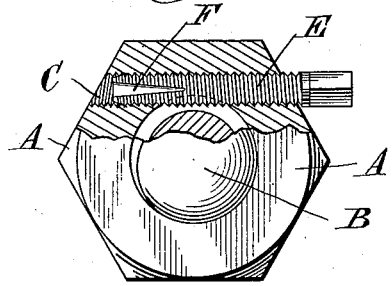
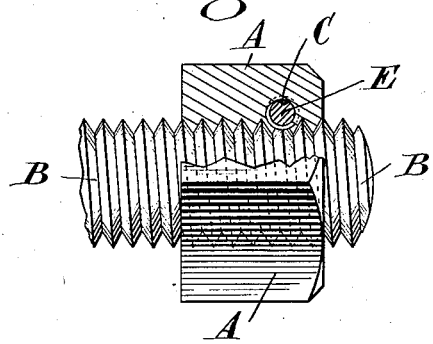
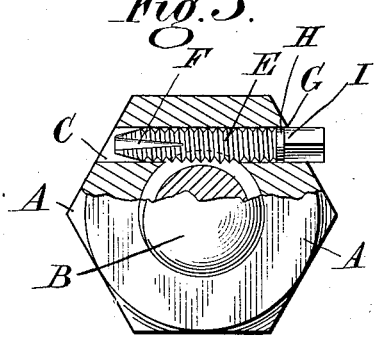
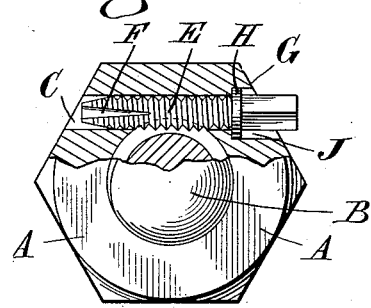
Witnesses:
Inventor
Albert T. Hughes
By
James L. Norris
Atty.

UNITED STATES PATENT OFFICE.

ALBERT THOMAS HUGHES, OF LONDON, ENGLAND.

MEANS FOR LOCKING NUTS TO BOLTS.

No. 859,814.
Specification of Letters Patent.
Patented July 9, 1907.

Application filed April 1, 1907. Serial No. 365,761.

*To all whom it may concern:*

Be it known that ALBERT THOMAS HUGHES, a subject of the King of Great Britain, residing at 10 Furzedown Terrace, Rectory Lane, Tooting, London, England, has invented certain new and useful Improvements in Means for Locking Nuts to Bolts, of which the following is a specification.

This invention relates to that class of means for locking nuts to bolts wherein a pin is driven through a hole made across the nut, and during the driving, cuts away a portion of the screw thread of the bolt to prevent the nut from turning, due to vibration, the pin in some cases being held secure against falling out by a burring of the nut against a reduced end.

The object of my present invention is to construct means for locking nuts to bolts whereby a better security is afforded for preventing the pin working loose, due to the vibration of the machinery.

My invention will be clearly understood from the following description aided by the examples shown on the accompanying drawings.

Figure 1. is a part sectional end elevation, and Fig. 2. a part sectional side elevation of the nut A and part of a bolt B, the nut being provided with a screw threaded hole C across it, and in such a position that a portion of the screw thread of the bolt lies within the hole C of the nut A. Into this screw threaded hole C I screw a screw threaded pin E having one, two or more grooves F, to allow it to act as a screw tapping tool, so that as the screw pin E is worked along the screw thread of the hole C, it cuts its way through the thread of the bolt, and forms a screw thread on the screw thread of the bolt at that part and at right angles to the proper screw thread of the bolt, the grip being sufficient to hold the pin E firmly in place.

Fig. 3. is a part sectional end elevation of a bolt and nut in which the hole C is plain, the screw threaded pin E cutting into the screw thread of the bolt B as at Figs. 1 and 2. In this case, the grip is practically only at the bolt portion, and to further prevent any movement of the pin E, the portion G of the nut may be hammered or burred down over the collar H of the pin E, the burring closing on the portion I of the pin by which it is screwed into the hole C.

Fig. 4. is a similar view to Fig. 3 except that the collar H is of larger diameter than the pin E and fits in a recess J of the nut, the portion G when burred down effectually preventing any movement of the nut A.

The pin C is extracted by an unscrewing action, which opens out the burred over portions and allows the pin E to be removed.

What I do claim and desire to secure by Letters Patent is:—

1. In a nut and bolt lock, a bolt having a threaded stem, a nut having an opening provided with screw threads for engagement with the threads of the bolt, said nut further provided with a transverse opening intersecting the first mentioned opening, a threaded pin mounted in said opening and having its end provided with recesses forming burs to produce a cutting point on the pin to initially cut the thread of the bolt.

2. In a nut and bolt lock, a bolt having a threaded stem, a perforated nut having internal threads for engagement with the threads of the bolt, said nut having an opening intersecting the perforation in the nut, and a threaded pin having an extended end provided with a plurality of inwardly tapering grooves forming burs at the end portion of said pin to initially cut the threads of the bolt.

3. In a nut and bolt lock, a bolt having a threaded stem, a perforated nut having internal threads for engagement with the threads of the bolt, said nut having an opening intersecting the perforation in the nut, a threaded pin having its end provided with a plurality of grooves forming burs at the end portion of said pin to initially cut the threads of the bolt, and a shoulder near the opposite end of said pin forming a stop therefor.

In testimnoy whereof I have hereunto set my hand in presence of two subscribing witnesses.

ALBERT THOMAS HUGHES.

Witnesses:
WM. O. BROWN,
HUGH HUGHES.